(12) United States Patent
Lim et al.

(10) Patent No.: US 11,574,339 B1
(45) Date of Patent: Feb. 7, 2023

(54) MODELING LIFT OF METRICS FOR TRIGGERING PUSH NOTIFICATIONS

(71) Applicant: Google LLC, Mountain View, CA (US)

(72) Inventors: Yew Jin Lim, Saratoga, CA (US); James Kunz, Los Altos, CA (US); Randolph Gregory Brown, Palo Alto, CA (US); Beidou Wang, Mountain View, CA (US); David Hou, Cupertino, CA (US); Kyle Zaragoza, East Palo Alto, CA (US); Yi Li, Palo Alto, CA (US); Nikita Kirnosov, Foster City, CA (US); Tao Feng, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 1 day.

(21) Appl. No.: 16/705,919

(22) Filed: Dec. 6, 2019

Related U.S. Application Data

(60) Provisional application No. 62/929,002, filed on Oct. 31, 2019.

(51) Int. Cl.
  *G06Q 30/00* (2012.01)
  *G06Q 30/02* (2012.01)
  *G06N 20/00* (2019.01)
  *G06Q 50/00* (2012.01)

(52) U.S. Cl.
  CPC ......... *G06Q 30/0254* (2013.01); *G06N 20/00* (2019.01); *G06Q 50/01* (2013.01)

(58) Field of Classification Search
  CPC ..... G06Q 30/0254; G06Q 50/01; G06N 20/00
  See application file for complete search history.

(56) References Cited

U.S. PATENT DOCUMENTS

| | | |
|---|---|---|
| 9,467,567 B1 | 10/2016 | Barkan et al. |
| 10,291,741 B2 | 5/2019 | Ratiu et al. |
| 2017/0046736 A1* | 2/2017 | Elmachtoub ....... G06Q 30/0255 |
| 2017/0169465 A1* | 6/2017 | Capel ................. G06Q 30/0277 |

(Continued)

OTHER PUBLICATIONS

Katevas; Modeling Lift of Metrics for Triggering Push Notifications; IEEE research paper; 15 pages; 2018.*

(Continued)

*Primary Examiner* — Radu Andrei
(74) *Attorney, Agent, or Firm* — Gray Ice Higdon

(57) ABSTRACT

Processor(s) of a client device can: analyze one or more features of an electronic resource that is under consideration for solicitation to a user; determine a notification likelihood that the user will access the electronic resource in response to an unsolicited notification of the electronic resource being output to the user; determine a baseline likelihood that the user will access the electronic resource without being solicited; compare the notification likelihood with the baseline likelihood; and cause, based on the comparing, the unsolicited notification to be output to the user. In some implementations, determining the notification likelihood and/or the baseline likelihood is based on applying data associated with the electronic resource as input across a machine learning model to generate output indicative of the notification likelihood and/or the baseline likelihood. In other implementations, determining the notification likelihood and/or the baseline likelihood is based on past behavior or preference(s) of the user.

8 Claims, 6 Drawing Sheets

(56) References Cited

U.S. PATENT DOCUMENTS

| | | | | |
|---|---|---|---|---|
| 2018/0150883 A1* | 5/2018 | Davin | ................ | G06Q 30/0269 |
| 2018/0315096 A1* | 11/2018 | Lewis | ................ | G06Q 30/0273 |
| 2019/0371342 A1* | 12/2019 | Tukka | ................... | H04M 1/724 |
| 2020/0034750 A1* | 1/2020 | Ritter | ..................... | G06N 20/00 |

OTHER PUBLICATIONS

Okoshi; Attention_and_engagement-awareness_in_the_wild_A_large-scale_study_with_adaptive_notifications; IEEE Conf; 11 pages, 2017.*

* cited by examiner

MODELING LIFT OF METRICS FOR TRIGGERING PUSH NOTIFICATIONS

BACKGROUND

Notifications are an effective feature that are used to influence individuals (referred to herein as "users") to engage with electronic resources (e.g., web pages, online applications, online databases, networked appliances, etc.). The notifications are often "pushed" to client devices of users in an unsolicited manner. The decision of whether to push an unsolicited notification to a user is typically made based on a predicted benefit of doing so. For example, if a relatively high predicted click-through rate ("pCTR") is calculated for pushing a particular user a pop-up notification containing a hyperlink to an electronic resource (e.g., a web page), then the notification may be pushed in the hopes that the user is likely to click on the hyperlink.

By contrast, if it is predicted that the user is unlikely to click on the hyperlink and/or to reject the unsolicited notification altogether, the unsolicited notification may not be sent. However, deciding whether to push an unsolicited notification to a user based solely on such a metric may be inadequate in some circumstances. For example, no consideration is given to a likelihood that the user would have engaged with the digital content (or with similar digital content) anyways, even without receiving an unsolicited notification. Moreover, many users find that being inundated with unsolicited notifications can be a distraction and/or annoyance. Further, some users have begun practicing "digital well-being" and are actively trying to reduce the amount of unsolicited notifications that they receive, if any.

SUMMARY

Some implementations disclosed herein are directed to triggering an unsolicited or "push" notification to a user based on more than the likelihood (referred to herein as a "notification likelihood") that the user will access an electronic resource in response to the push notification. In particular, techniques are described herein for determining an incremental difference between the aforementioned notification likelihood and what is referred to herein as a "baseline likelihood" that the user would access the electronic resource anyways, regardless of whether the user ever receives a push notification. Various implementations analyze one or more features of an electronic resource that is under consideration for solicitation to a user. Based on the analysis, those implementations determine a notification likelihood that the user will access the electronic resource in response to an unsolicited notification of the electronic resource being output to the user, and determine a baseline likelihood that the user will access the electronic resource without being solicited. Further, those implementations compare the notification likelihood with the baseline likelihood. Based on the comparison, those implementations determine whether to cause the unsolicited notification to be output to the user.

As used herein, an "electronic resource" may include, but is not limited to, a web page, a linked-to document, an audio file, an audio/visual file, a game, an article, a social media post, a digital image, an indication of a state of a networked appliance that is controllable over one or more networks, and so forth. As used herein, an electronic resource may be "accessed" in various ways, such as being downloaded, opened in a web browser or other application, streamed, launched, viewed, played, interacted with or controlled (e.g., turning a thermostat up or down, turning an oven on or off, turning lights on or off, turning off sprinklers, closing blinds for a window, and/or other control(s) of networked appliances), etc. Further, an electronic resource can be "acted upon" in various ways, and determining the electronic resource was acted upon can be based on sensor data of a client device of a user, sensor data of additional client device(s) of the user, and/or data of a networked appliance associated with the user. For example, the sensor data can be generated locally at client device based on one or more sensors of the client device, and can include location data via a location sensor, accelerometer data via an accelerometer, heart rate data via a heart rate sensor, pedometer data via a pedometer, magnetometer data via a magnetometer, gyroscope data via a gyroscope, and/or other sensor data generated by additional sensor(s) of the client device. As another example, the sensor data can also be generated remotely at additional client device(s) (e.g., smart watch, smartphone, smart glasses, and so forth) and/or data can also be generated by networked appliance(s) associated with the user and transmitted to the client device of the user via one or more networks (e.g., Internet, Bluetooth, Near-field communication, Wi-Fi, and so forth).

As used herein, a "notification" such as a "push notification" or "unsolicited notification" may be interacted with by a user to access an electronic resource. Notifications may take various forms, such as a pop-up window or card rendered on a display (e.g., as part of a home screen, feed, vehicle computing display, etc.), synthesized spoken output from an automated assistant or chat bot (e.g., to which a user can utter a response indicating whether the user wants to access the electronic resource), a text message, an email, a ticker tape notification, a notification on social media, and so forth.

In various implementations, both a baseline likelihood and a notification likelihood may be generated for an electronic resource under consideration for solicitation to a user. As noted above, the baseline likelihood represents a predicted probability that the user would access the electronic resource without receiving an unsolicited notification about it. The notification likelihood represents a predicted probability that the user would access the electronic resource in response to the unsolicited notification, e.g., by clicking on a hyperlink in the notification. In some implementations, a difference or "lift metric" between the baseline likelihood and the notification likelihood may be determined and compared with a threshold. In some such implementations, if the difference satisfies the threshold (e.g., at least a minimum difference), then the unsolicited notification may be pushed to the user.

In various implementations, the baseline likelihood may be predicted using a trained machine learning model. For example, a support vector machine, feed-forward neural network, hidden Markov model, or another similar machine learning model may be trained using training data that includes individual training examples for which unsolicited notifications were generated but ultimately not pushed to user(s). Each training example may be labeled to indicate, for instance, subsequent access or non-access of the given electronic resource by a user to which the notification was targeted. Inputs for such a machine learning model may include, for instance, features extracted from the generated notification, features of the electronic resource linked-to by the notification (e.g., substance of the electronic resource, configurable parameters of the electronic resource, etc.), features of the user to which the notification is targeted, features of other similar users (e.g., with similar tastes, preferences, demographics), and so forth.

In addition to or instead of determining the incremental benefit of pushing a notification to a user, in some implementations, a "disengagement probability" that pushing the notification will alienate or frustrate the user may be considered. The disengagement probability may be a predicted likelihood that an unsolicited notification will cause a user to disengage from a communication feed through which the unsolicited notification is pushed. Suppose the user would receive the unsolicited notification through a particular feed to which the user is subscribed. Suppose further that the notification likelihood for the user is relatively great, but that the disengagement probability is even greater. In such a situation, the disengagement probability may outweigh the potential incremental benefit of pushing the notification.

It should be understood that techniques disclosed herein can be implemented locally on a client device, remotely by server(s) connected to the client device via one or more networks, and/or both. Moreover, by considering the baseline likelihood that the user would have engaged with the electronic resource without receiving an unsolicited notification, local and/or network resources can be conserved as compared to known techniques for providing unsolicited notifications. Further, in implementations where the electronic resource is a networked appliance, providing an unsolicited notification to control the networked appliance can help conserve natural resources. For example, if the unsolicited notification includes an indication that a back porch light was left on when a user left for work and allows the user to turn the light off, then electricity can be conserved by allowing the user to turn the light off by directing input at the unsolicited notification. As another example, if the unsolicited notification includes an indication that a sprinkler was left on throughout the evening and allows the user to turn the sprinkler off, then water can be conserved by allowing the user to turn the sprinkler off by directing input at the unsolicited notification. Although the natural resources conserved by a single unsolicited notification for a given user may be negligible, a substantial amount of natural resources can be conserved when considering the aggregate amount of unsolicited notifications for a plurality of users.

DETAILED DESCRIPTION

Figure 1:
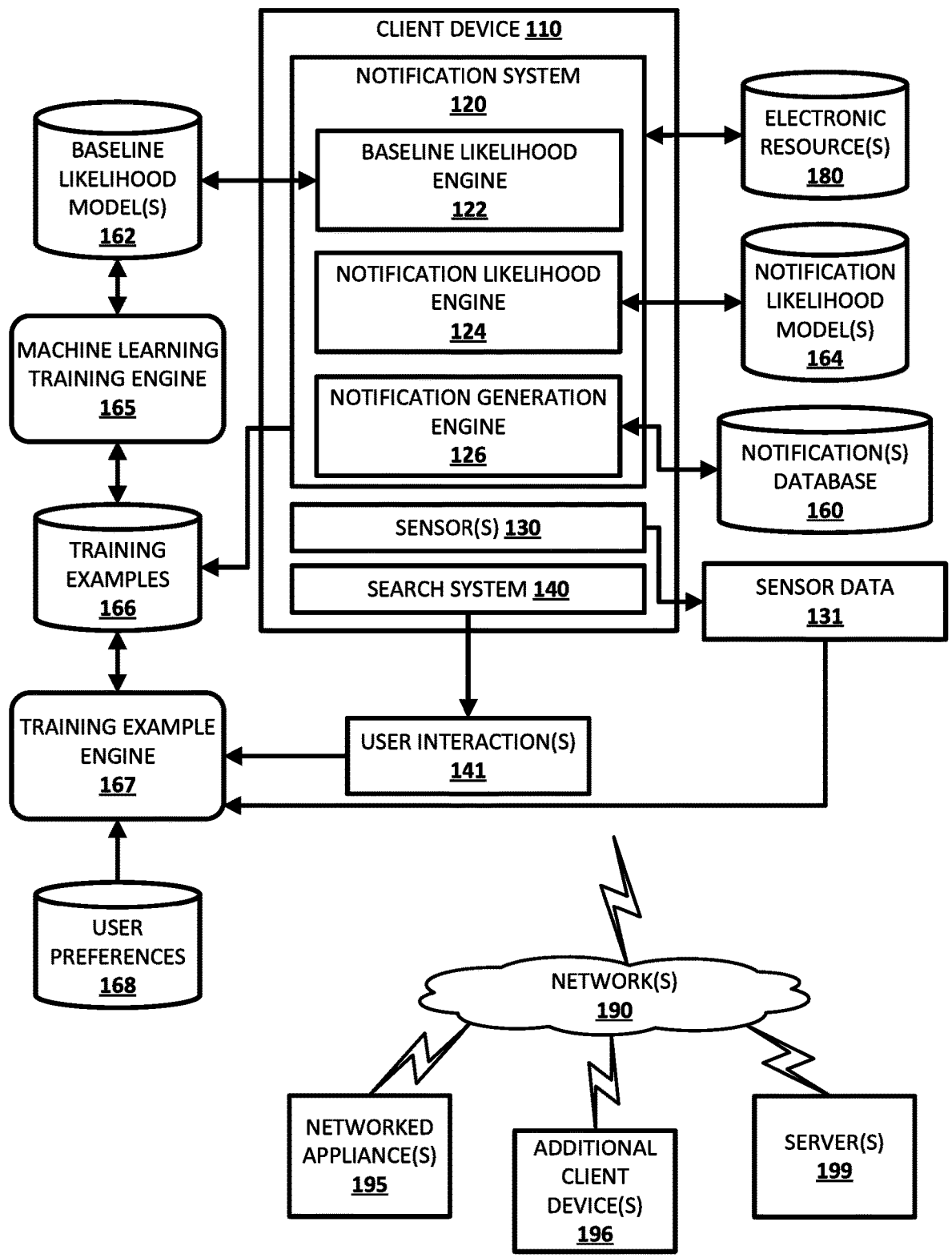
FIG. 1 depicts a block diagram of an example environment that demonstrates various aspects of the present disclosure, and in which implementations disclosed herein may be implemented.

FIG. 1 illustrates a block diagram of an example environment that demonstrates various aspects of the present disclosure. A client device 110 of a user is illustrated in FIG. 1, and includes a notification system 120, one or more sensors 130, and a search system 140. The notification system 120 can generate a corresponding unsolicited notification based on analyzing and/or extracting one or more features from a given electronic resource. In some implementations, the client device 110 determines whether to cause the corresponding unsolicited notification to be output at the client device 110 of the user based on determining an incremental benefit ("lift metric") of pushing the corresponding unsolicited notification to the client device 110. In some other implementations, the client device 110 refrains from causing the corresponding unsolicited notification to be output to the user and determines whether the user acted upon and/or accessed the given electronic resource even though the corresponding unsolicited notification was not pushed to the client device 110. In some versions of those other implementations, at least the features of the given electronic resource and/or the determination of whether the user acted upon and/or accessed the given electronic resource can be used in training one or more machine learning models.

The notification system 120 can access a plurality of electronic resources that include content of interest to the user of the client device 110. The electronic resources can include web pages, linked-to documents, audio files, audio/visual files, games, articles, social media posts/events, digital images, networked appliances that are controllable over a computer network, and so forth. Determining a given electronic resource is of interest to the user can be based on content stored locally on the client device 110 of the user (e.g., media playlists, photo albums, videos, contact lists, and/or other content), past user interactions with the client device 110 or additional client device(s) 196 (e.g., search history of a web browser, social media posts/comments, navigational history, and/or other user interactions), one or more software application installed on the client device 110 or the additional client device(s) 196 (e.g., software applications associated with communication feeds, software applications associated with networked appliances, and so forth), historical usage of networked appliance(s) 195 (e.g., the user controls a particular networked appliance at a particular time of day or day of week), and/or other measures.

In some implementations, data indicative of the electronic resources are stored in an electronic resource(s) database 180. In some additional and/or alternative implementations, data indicative of the electronic resources are transmitted to the client device 110 from remote database(s) (not depicted), networked appliance(s) 195, and/or additional client device(s) 196 associated with the user of the client device 110 via network(s) 190 (e.g., Local Area Network ("LAN"), Wide Area Network ("WAN"), Bluetooth, Near-field communication, and/or other networks).

The notification system 120 can include a notification generation engine 126. The notification generation engine 126 can analyze and/or extract features from a given electronic resource to generate a corresponding unsolicited notification in response to receiving one or more signals. The one or more signals can include, for example, content being recently added to web pages or linked-to documents; previously added content being updated on web pages or linked-to documents; audio, audio/visual files, or digital images being uploaded to web pages; updates being available for one or more software applications; recently added or updated social media posts/events; a particular state of a networked appliance being maintained beyond a usual period of time; and/or other signals.

Moreover, in some implementations, the corresponding unsolicited notification generated by the notification generation engine 126 can be stored in notification(s) database 160. In some versions of those implementations, the notification system 120 can retrieve the corresponding unsolicited notification from the notification(s) database 160 in response to determining the corresponding unsolicited notification should be output to the client device 110 of the user. In yet other versions of those implementations, the notification system 120 can remove the corresponding unsolicited notification from the notification(s) database 160 in response to determining the corresponding unsolicited notification should not be output to the client device 110 of the user. Further, in other implementations, the notification system 120 can store the corresponding unsolicited notification in training examples database 166 for use in training and/or updating one or more machine learning models (e.g., baseline likelihood model(s) 162).

The notification system 120 can also include a baseline likelihood engine 122 and a notification likelihood engine 124. The notification likelihood engine 124 can determine a notification likelihood that the user will access and/or act upon the given electronic resource in response to the corresponding unsolicited notification being output to the client device 110 of the user. In some implementations, the notification likelihood engine 124 determines the notification likelihood by applying the analyzed and/or extracted features of the given electronic resource as input across notification likelihood model(s) 164. In some versions of those implementations, the notification likelihood model(s) 164 are machine learning models trained to generate a notification probability that the user will access and/or act upon the given electronic resource in response to the corresponding unsolicited notification being output to the client device 110 of the user. These notification likelihood model(s) 164 can include, but are not limited to, various neural network models, support vector machines ("SVMs"), decision trees, and/or other types of machine learning models.

In contrast to the notification likelihood engine 124, the baseline likelihood engine 122 can determine a baseline likelihood that the user will access and/or act upon the given electronic resource without the corresponding unsolicited notification being output to the client device 110 of the user. In some implementations, the baseline likelihood engine 122 determines the baseline likelihood by applying the analyzed and/or extracted features of the given electronic resource, the corresponding unsolicited notification, user preferences (e.g., from user preferences database 168), and/or the past behavior of the user as input across baseline likelihood model(s) 162. In some versions of those implementations, the baseline likelihood model(s) 162 are machine learning models trained to generate a baseline probability that the user will access and/or act upon the given electronic resource without the corresponding unsolicited notification being output to the client device 110 of the user. Similar to the notification likelihood model(s) 164, the baseline likelihood model(s) 162 can include, but are not limited to, various neural network models, SVMs, decision trees, and/or other types of machine learning models.

In some implementations, the baseline likelihood model(s) 162 and the notification likelihood model(s) 164 are distinct machine learning models trained to generate the baseline likelihood and the notification likelihood, respectively. The notification system 120 can determine whether to cause the corresponding unsolicited notification to be output at the client device 110 of the user based on the notification likelihood and the baseline likelihood as described herein (e.g., as described in FIG. 3). For example, assume that the baseline likelihood model(s) 162 is trained to generate the baseline probability, and assume that the notification likelihood model(s) 164 is trained to generate the notification probability. The notification system 120 can determine an incremental benefit ("lift metric") of pushing the corresponding unsolicited notification to the client device 110 based on comparing the baseline probability and the notification probability. Further, in this example, if the difference between the baseline probability and the notification probability satisfies a threshold, then the notification system 120 can retrieve the corresponding unsolicited notification from the notification(s) database 160 and cause the corresponding unsolicited notification to be output at the client device 110 of the user. However, in this example, if the difference between the baseline probability and the notification probability fails to satisfy a threshold, then the notification system 120 can refrain from causing the corresponding unsolicited notification to be output at the client device 110 of the user, and optionally remove the corresponding unsolicited notification from the notification(s) database 160.

In other implementations, the baseline likelihood model(s) 162 and the notification likelihood model(s) 164 are portions of an end-to-end machine learning model trained to generate a predicted likelihood as output, as opposed to the baseline likelihood and the notification likelihood. The notification system 120 can determine whether to cause the corresponding unsolicited notification to be output at the client device 110 of the user based on the predicted likelihood, such that the predicted probability represents the incremental benefit ("lift metric") of pushing the corresponding unsolicited notification to the client device 110. For example, assume that the end-to-end machine learning model is trained to generate a predicted probability for determining whether to cause the corresponding unsolicited notification to be output at the client device 110 of the user. Further, in this example, if the predicted probability satisfies a threshold, then the notification system 120 can retrieve the corresponding unsolicited notification from the notification(s) database 160 and cause the corresponding unsolicited notification to be output at the client device 110 of the user. However, in this example, if the predicted probability fails to satisfy a threshold, then the notification system 120 can refrain from causing the corresponding unsolicited notification to be output at the client device 110 of the user, and optionally remove the corresponding unsolicited notification from the notification(s) database 160. Although these implementations are described as retrieving the corresponding unsolicited notification from the notification(s) database 160 when the lift metric satisfies a threshold, it should be understand that is not meant to be limiting. For example, in some implementations, the notification generation engine 126 may generate the corresponding unsolicited notification in response to determining the lift metric satisfies a threshold.

As noted above, in some implementations, the notification system 120 can refrain from causing the corresponding unsolicited notification to be output at the client device 110 of the user, and can store the corresponding unsolicited notification in the training examples database 166 for use in training and/or updating one or more machine learning models (e.g., baseline likelihood model(s) 162). In some versions of those implementations, the notification system 120 can determine whether the user accessed and/or acted upon the given electronic resource for the corresponding unsolicited notification based on sensor data 131 from one or more of the sensors 130 of the client device 110 and/or based on user interaction(s) 141 (e.g., with search system 140, with software applications installed on the client device 110 of the user, with networked appliance(s) 195, and/or other user interactions).

In some implementations, the sensor data 131 can be generated locally at the client device 110 based on one or more of the sensors 130 of the client device 110, and can include location data via a location sensor, accelerometer data via an accelerometer, heart rate data via a heart rate sensor, pedometer data via a pedometer, magnetometer data via a magnetometer, gyroscope data via a gyroscope, and/or other sensor data generated by a corresponding sensor of the client device 110. In some additional and/or alternative implementations, the sensor data 131 can be generated remotely by sensor(s) of the networked appliance(s) 195 (e.g., to indicate a change in a state of a given networked appliance of the networked appliance(s) 195) and/or by sensor(s) of the additional client device(s) 196. In some versions of these additional and/or alternative implementations, the sensor data 131 can be transmitted to the client device 110 via the network(s) 190.

In some implementations, the user interaction(s) 141 are based on interactions with the client device 110. In some versions of these implementations, the interactions with the client device 110 are based on interactions with the search system 140, such as issuing various search queries, navigating to various web pages and/or linked-to documents, viewing various digital images and/or audio/visual files, interacting with various social media posts/events, launching one or more software applications, and/or other interactions. In some versions of these implementations, the interactions with the client device 110 are based on interactions with publicly available content (e.g., content available over the Internet). In some additional and/or alternative versions of these implementations, the interactions with the client device 110 are based on interactions with private content (e.g., interactions with a photo album, contacts list, media playlist, and/or interactions with other private content).

Moreover, based on whether the user accesses and/or acts upon the given electronic resource, the notification system 120 can label the corresponding unsolicited notification to indicate an outcome of whether the user accessed and/or acted upon the given electronic resource. Further, a training example engine 167 can store the label in the training examples database 166 in association with the corresponding unsolicited notification. In some implementations, if the user accesses and/or acts upon the given electronic resource, then the corresponding unsolicited notification can be labeled to indicate the user accessed and/or acted upon the given electronic resource. In some other implementations, if the user does not access and/or act upon the given electronic resource, then the corresponding unsolicited notification can be labeled to indicate the user did not access and/or act upon the given electronic resource. Further, in some implementations, the notification system 120 only considers the sensor data 131 and the user interactions 141 that occur within a threshold period of time or within a threshold range of time for labeling the corresponding the unsolicited notification for training.

For example, assume that the notification generation engine 126 generates an unsolicited notification that notifies the user of an upcoming concert as indicated by a social media event, and assume that the notification system 120 refrains from causing the unsolicited notification to be output at the client device 110 of the user such that it can be used in training and/or updating one or more machine models (e.g., baseline likelihood model(s) 162). Further assume that location data associated with the client device 110 indicates the user is at the location of the concert within a threshold range of the time of the concert. In this example, the unsolicited notification that notifies the user of the upcoming concert can be labeled to indicate the user acted upon the social media event by attending the concert without the unsolicited notification being output to the client device 110 of the user. In contrast, assume that location data associated with the client device 110 indicates the user is at the location of the concert, but not within a threshold range of time of the concert. In this example, the unsolicited notification that notifies the user of the upcoming concert can be labeled to indicate the user did not act upon social media event by not attending the concert without the unsolicited notification being output to the client device 110 of the user.

As another example, assume that the notification generation engine 126 generates an unsolicited notification that notifies the user of a newly added blog post on the user's favorite web page as indicated by an updated web page, and assume that the notification system 120 refrains from causing the unsolicited notification to be output at the client device 110 of the user such that it can be used in training and/or updating one or more machine models (e.g., baseline likelihood model(s) 162). Further assume that search history of the search system 140 of the client device 110 indicates the user viewed the newly added blog post within a threshold period of time of the blog post being added (e.g., 48 hours). In this example, the unsolicited notification that notifies the user of the newly added blog post can be labeled to indicate the user did in fact view the newly added blog post without the unsolicited notification being output to the client device 110 of the user. In contrast, assume that search history of the search system 140 of the client device 110 indicates the user has not viewed the newly added blog post within a threshold period of time of the blog post being added (e.g., 72 hours). In this example, the unsolicited notification that notifies the user of the newly added blog post can be labeled to indicate the user did not view the newly added blog post within the threshold period of time.

After the training example engine 167 associates the label with the corresponding unsolicited notification, it can store the label in the training examples database 166 in association with the corresponding unsolicited notification (and optionally in association with user preferences from, for example, user preferences database 168), thereby resulting in a training example. A machine learning training engine 165 can retrieve the training example, and additional training examples generated using similar techniques, from the training examples database 166 to train and/or update the baseline likelihood model(s) 162. In some implementations, the machine learning training engine 165 can train and/or update the baseline likelihood model(s) 162 in real-time. In other implementations, the machine learning training engine 165 can train and/or update the baseline likelihood model(s) 162 in when one or more conditions are satisfied. The one or more conditions can include, for example, that the training examples database 166 includes a threshold number of training examples, that the client device 110 is charging, that the client device 110 has at least a threshold state of charge, that a temperature of the client device 110 (based on one or more on-device temperature sensors) is less than a threshold, and/or that the client device 110 is not being held by a user.

Moreover, in some implementations, the analyzed and/or extracted features for a given unsolicited notification and/or user preferences from the user preferences database 168 can be utilized as training example input in training and/or updating the baseline likelihood model(s) 162. In some further versions of those implementations, the label can be utilized as training example output. By using this supervised training technique to train and/or update the baseline likelihood model(s) 162, the machine learning training engine 165 can determine an error based on a predicted baseline likelihood (e.g., 0.40) and the label (e.g., an outcome of whether the user accessed and/or acted upon the electronic resource, 0.00 or 1.00, etc.). Further, the machine learning training engine 165 can utilize backpropagation and/or other techniques to update one or more weights of the baseline likelihood model(s) 162 based on the determined error. It is noted that, in some implementations, the machine learning training engine 165 can utilize batch techniques to update the baseline likelihood model(s) 162 based on the determined error of multiple training instances. In this manner, the baseline likelihood model(s) 162 can be trained and/or updated locally on the client device 110, and can also be personalized for the user of the of client device 110.

Although certain aspects of FIG. 1 are discussed in connection with certain operations being performed locally on the client device 110 of the user that is not meant to be limiting. It should be understood that these operations can be performed by the client device 110 of the user, additional client device(s) 196 of the user, server(s) 199 in communication with the client device 110 via the network(s) 190 (e.g., Internet, Local Area Network ("LAN"), Wide Area Network ("WAN"), Bluetooth, Near-field communication, and/or other networks), and/or any combination thereof. For instance, components 122-126 can be implemented in part or even entirely on server 199. Moreover, although certain aspects of FIG. 1 are discussed in connection with various databases being stored locally on the client device 110 of the user that is not meant to be limiting. It should be understood that these various databases can be stored locally on the client device 110 and/or remotely on the additional client device(s) 196 of the user and/or server(s) 199 in communication with the client device 110 via the of the network(s) 190.

As one non-limiting example, the client device 110 can initially receive a global baseline likelihood model from the server(s) 199 via the network(s) 190, and the client device 110 can further train and/or update the global baseline likelihood model on the client device 110 using training examples from the training examples database 166 that were generated locally at the client device 110 based on the sensor data 131 and/or the user interaction(s) 141. In this manner, the global baseline likelihood model can be tailored to the user of the client device 110. As another non-limiting example, the client device 110 can generate the training examples locally on the client device 110, and can transmit the training examples to the server(s) 199 via the network(s) 190 such that the server(s) 199 can utilize the training examples from the client device 110 (and training examples generated at the additional client device(s) 196 using similar techniques) to update a global baseline likelihood model. As yet another non-limiting example, the client device 110 can generate the training examples locally on the client device 110, train and/or update the baseline likelihood model(s) 162 locally at the client device, and transmit one or more of the weights of the baseline likelihood model(s) 162 to the server(s) 199 (without transmitting the training examples) such that the server(s) can update a global baseline likelihood model based on one or more of the weights of the baseline likelihood model(s) 162.

Moreover, the client device 110 can also include various components not depicted in FIG. 1. For example, the client device 110 can also include touch-sensitive display(s) for visually rendering an unsolicited notification and/or other visual content, and for receiving touch input directed to the client device 110. As another example, the client device 110 can also include speaker(s) for audibly rendering an unsolicited notification and/or other audible content. As yet another example, the client device 110 can also include microphone(s) for capturing spoken utterances of the user, and/or for capturing other voice input directed to the client device 110.

Figure 2:
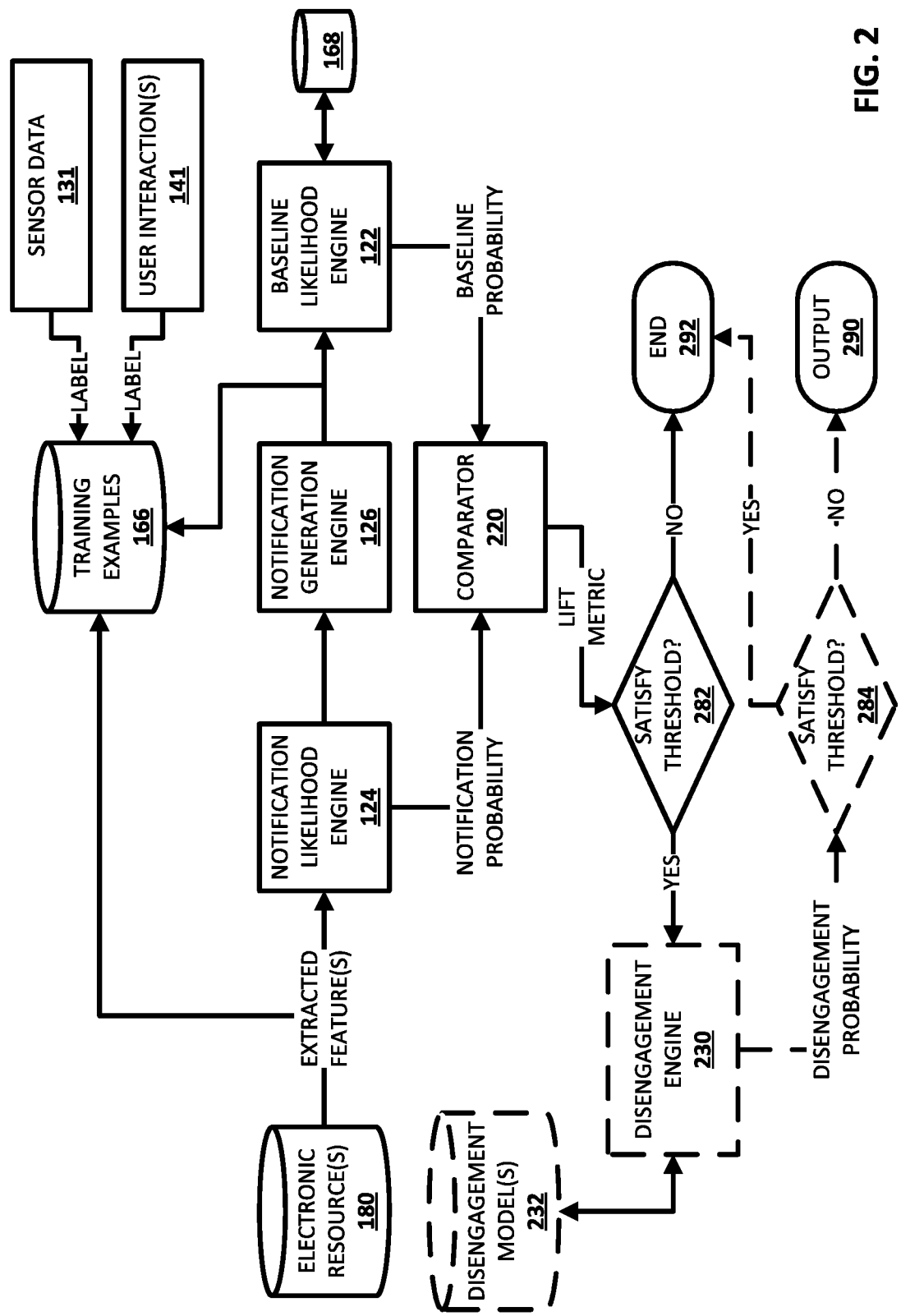
FIG. 2 depicts an example process flow that demonstrates various aspects of the present disclosure, in accordance with various implementations.

FIG. 2 illustrates an example process flow that demonstrates various aspects of the present disclosure, in accordance with various implementations. For convenience, operations of the process flow are described as being performed by a system, such as client device 110 of FIG. 1, additional client device(s) 196, server(s) 199 of FIG. 1, computing device 710 of FIG. 7, a cloud-based system, other systems, and/or any combination thereof. Although the operations of the process flow of FIG. 2 are described in a particular order that is not meant to be limiting, and it should be understood that one or more of the operations can be reordered and/or omitted, and that other operations can be added.

The system can analyze and/or extract feature(s) of a given electronic resource included in an electronic resource(s) database 180. The feature(s) of the given electronic resource can include: content of a web page, linked-to document, article, or social media post; time, date, and location information for an event; an indication of a state of a networked appliance (e.g., networked appliance(s) 195 of FIG. 1); entities included in an image, audio, or audio/visual file; metadata; and/or other features. Further, the system can provide the analyzed and/or extracted features to for the given electronic resource to notification likelihood engine 124. In some implementations, the system can also provide the analyzed and/or extracted features for the given electronic resource to training examples database 166 for use in training and/or updating one or more machine learning models.

The notification likelihood engine 124 can determine, based on the analyzed and/or extracted features for the given electronic resource, a notification likelihood (or "probability") that the user will access and/or act upon the given electronic resource in response to the corresponding unsolicited notification being output to the user. For example, assume that notification likelihood model(s) 164 are trained to generate a notification probability for the notification, and that the notification probability represents a probability that the user will access and/or act upon the given electronic resource in response to the corresponding unsolicited notification being output to the user. In this example, the notification likelihood engine 124 can apply the analyzed and/or extracted features for the given electronic resource as input across the notification likelihood model(s) 164 to generate the notification probability. The system can further provide the notification probability to comparator 220, and can also provide the analyzed and/or extracted features for the given electronic resource to notification generation engine 126.

The notification generation engine 126 can generate a corresponding unsolicited notification for the given electronic resource based on the analyzed and/or extracted features. The corresponding unsolicited notification can be stored in notification(s) database 160. Further, the system can provide the analyzed and/or extracted features for the given electronic resource and/or provide the corresponding unsolicited notification to baseline likelihood engine 122. In some implementations, the system can also provide the corresponding unsolicited notification to the training examples database 166. In versions of those implementations, the corresponding unsolicited notification can be stored in the training examples database 166 in association with the analyzed and/or extracted features for the given electronic resource. Although the process flow of FIG. 2 depicts the notification generation engine 126 generating the unsolicited notification subsequent to determining the notification likelihood, it should be understand that is not meant to be limiting. As one non-limiting example, the notification generation engine 126 may generate the corresponding unsolicited notification in response to determining the lift metric satisfies a threshold 282 and/or a disengagement probability fails to satisfy a threshold 284. As another non-limiting example, the notification generation engine 126 may generate the corresponding unsolicited notification before or after determining the notification likelihood and/or baseline likelihood.

Moreover, in some versions of those implementations, the system can refrain from causing the corresponding unsolicited notification from being output to the user and/or refrain from determining the notification likelihood and baseline likelihood, such that it can be used as a training example. As described in more detail herein (e.g., with respect to FIGS. 1 and 4), each training example can be labeled based on sensor data 131 and/or user interaction(s) 141 to indicate an outcome of determining whether the user accessed and/or acted upon the given electronic resource. Further, one or more machine learning models (e.g., baseline likelihood model(s) 162) can be trained and/or updated based on the labeled training examples in the training example database 166.

The baseline likelihood engine 122 can determine, based on the analyzed and/or extracted features for the given electronic resource, the corresponding unsolicited notification, past user behavior (e.g., how the user interacted with prior unsolicited notifications), and/or user preferences from user preferences database 168, a baseline likelihood that the user will access and/or act upon the given electronic resource without the corresponding unsolicited notification being output to the user. For example, assume that baseline likelihood model(s) 162 is trained to generate a baseline probability for the baseline likelihood, and that the baseline probability represents a probability that the user will access and/or act upon the given electronic resource without the corresponding unsolicited notification being output to the user. In this example, the baseline likelihood engine 122 can apply the analyzed and/or extracted features for the given electronic resource, the corresponding unsolicited notification, past user behavior, and/or the user preferences as input across the baseline likelihood model(s) 162 to generate the baseline probability. The system can further provide the baseline probability to the comparator 220.

The comparator 220 can compare the notification probability from the notification likelihood engine 124 and the baseline probability from the baseline likelihood engine 122. Based on comparing the notification probability and the baseline probability, the comparator 220 can determine an incremental benefit ("lift metric") of pushing the corresponding unsolicited notification to the user. The system can determine whether to cause the corresponding unsolicited notification to be output to the user based on this incremental benefit as indicated by the lift metric. By considering this incremental benefit as indicated by the lift metric, the techniques disclosed herein result in higher quality unsolicited notifications as compared to conventional techniques that fail to consider whether the user will access and/or act upon the given electronic resource without receiving the corresponding unsolicited notification for the given electronic resource.

The system can determine whether the lift metric satisfies a threshold 282. For example, assume the notification likelihood is a notification probability of 0.60, the baseline likelihood is a baseline probability of 0.20, and the threshold 282 is 0.30. In this example, the comparator 220 can determine a lift metric of 0.40 which satisfies the threshold 282 of 0.30. Accordingly, the system can determine (passing through and ignoring for the moment blocks 230 and 284) to output 290 the corresponding unsolicited notification based on the lift metric of 0.40 satisfying the threshold 282 of 0.30 even though the notification probability of 0.60 indicates there is only a moderate likelihood the user will access the given electronic resource in response to receiving the corresponding unsolicited notification. In contrast, assume the notification likelihood is a notification probability of 0.90, the baseline likelihood is a baseline probability of 0.80, and the threshold 282 is 0.30. In this example, the comparator 220 can determine a lift metric of 0.10 which fails to satisfy the threshold 282 of 0.30 even though the notification probability of 0.90 indicates there is a high likelihood the user will access the given electronic resource in response to receiving the corresponding unsolicited notification. Accordingly, the system can determine to refrain from outputting the corresponding unsolicited notification based on the lift metric of 0.10 failing to satisfy the threshold 282 of 0.10, and the process flow of FIG. 2 can end 292.

In addition to or instead of determining the incremental benefit of pushing the corresponding unsolicited notification to the user as indicated by the lift metric, in some implementations, a disengagement probability that pushing the corresponding unsolicited notification will alienate or frustrate the user may be considered. The disengagement probability may be a predicted likelihood that the corresponding unsolicited notification will cause the user to disengage (e.g., unsubscribe) from a communication feed through which the corresponding unsolicited notification is pushed. In such a situation, the disengagement probability may outweigh the potential incremental benefit of pushing the notification.

Moreover, if the system determines the lift metric satisfies the threshold 282, then the system can provide the analyzed and/or extracted features for the given electronic resource, the corresponding unsolicited notification, and/or user preferences from user preferences database 168 to disengagement engine 230. The system can also provide an indication of a particular communication feed for the given electronic resource to the disengagement engine 230. The communication feed can include, for example, a source of the given electronic resource, such as a software application, company, developer, retailer, networked appliance(s), social media network, and so forth. In some implementations, the communication feed may be, for instance, an RSS feed.

Further, the disengagement engine 230 can apply the analyzed and/or extracted features for the given electronic resource, the corresponding unsolicited notification, the user preferences, the past user behavior, and/or the particular communication feed as input across disengagement model(s) 232 to generate a disengagement probability. The disengagement model(s) 232 can be a machine learning model, such as those described herein. Further, the system can compare the disengagement probability to a threshold 284. The system can cause the corresponding unsolicited notification to be output 290 to the user if the lift metric satisfies the threshold 282 and/or if the disengagement probability fails to satisfy the threshold 284. In contrast, the system can refrain from causing the corresponding unsolicited notification to be output to the user if the disengagement probability satisfies the threshold 284, and the process flow of FIG. 2 can end 292.

For example, assume the system determines the lift metric satisfies the threshold 282 for an unsolicited notification indicating an upcoming release date for video game XYZ. Further assume the system previously sent a prior unsolicited notification indicating an upcoming release date for video game ABC, and the user accessed an underlying electronic resource for the prior unsolicited notification (e.g., clicked on a hyperlink included in the prior unsolicited notification). Based on the unsolicited notification including similar features as the prior unsolicited notification (e.g., upcoming release dates of video games, hyperlinks with more information related thereto, etc.) and/or based on the user previously accessing the underlying electronic resource for the prior unsolicited notification, the system may determine a disengagement probability (e.g., 0.10) fails to satisfy the threshold 284 (e.g., 0.50), and can cause the unsolicited notification indicating the upcoming release date for video game XYZ to be output 290 to the user.

In contrast, assume the system determines the lift metric satisfies the threshold 282 for an unsolicited notification indicating an upcoming release date for video game XYZ. Further assume the system previously sent a prior unsolicited notification indicating an upcoming release date for video game ABC, and the user dismissed the prior notification without accessing an underlying electronic resource for the prior unsolicited notification. Based on the unsolicited notification including similar features as the prior unsolicited notification (e.g., upcoming release dates of video games, hyperlinks with more information related thereto, etc.) and based on the user previously dismissing the prior unsolicited notification without accessing the underlying electronic resource, the system may determine a disengagement probability (e.g., 0.70) satisfies the threshold 284 (e.g., 0.50), and can refrain from causing the unsolicited notification indicating the upcoming release date for video game XYZ to be output to the user, and the process flow of FIG. 2 ends 292. In this instance, the system may refrain from causing the unsolicited notification to be output to the user to prevent any chance of the user from disengaging with the communication feed associated with video game XYZ. In other instances (e.g., as described in FIG. 5), the system may still cause the unsolicited notification to be output to the user if the disengagement probability is within a threshold range of the threshold 284.

Figure 3:
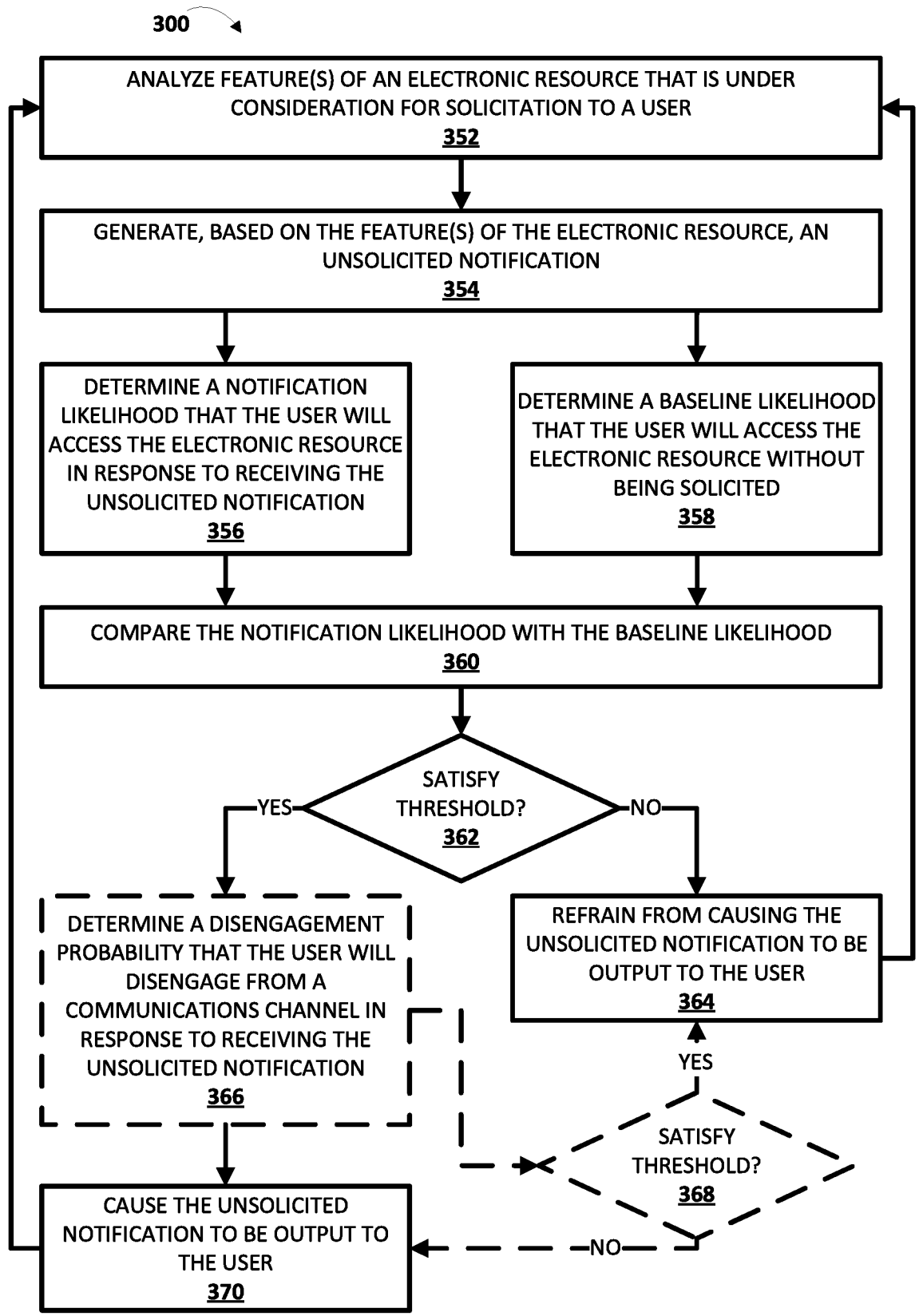
FIG. 3 depicts a flowchart illustrating an example method of determining whether to cause an unsolicited notification to be output to a user, in accordance with various implementations.

FIG. 3 depicts a flowchart illustrating an example method 300 of determining whether to cause an unsolicited notification to be output to a user. For convenience, the operations of the method 300 are described with reference to a system that performs the operations. This system of method 300 includes one or more processors and/or other component(s) of a client device (e.g., client device 110 of FIG. 1, computing device 710 of FIG. 7, and/or other client devices). Moreover, while operations of the method 300 are shown in a particular order, this is not meant to be limiting. One or more operations may be reordered, omitted, or added.

At block 352, the system analyzes one or more features of an electronic resource that is under consideration for solicitation of a user. For example, the electronic resource can be a web page, and the features of the web page can be content of interest to a user included in the web page, such as content related to an upcoming event, content related to an image or video included in the web page. As another example, the electronic resource can be a networked appliance that the system can control over a computer network, and the features of the networked appliance can be the state of the networked appliance, such as whether a light is "on", "off", or "dimmed", whether a door or window is "opened" or "closed", whether a sprinkler is "on" or "off", whether an oven is "on", "off", and/or a temperature thereof, and/or other states of other networked appliances.

Figures 5, 6A, 6B, 6C:
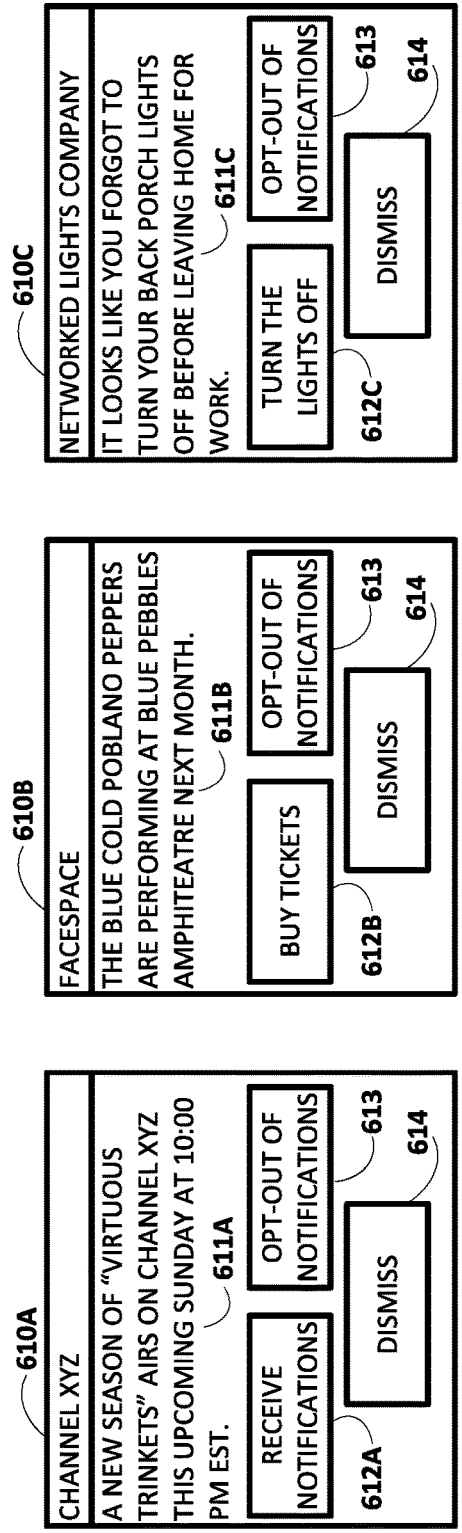
FIG. 5 depicts a table illustrating example metrics for a plurality of users and for a given unsolicited notification, in accordance with various implementations.
FIG. 6A, FIG. 6B, and FIG. 6C depict various non-limiting examples of unsolicited notifications, in accordance with various implementations.

At block 354, the system generates, based on one or more of the features of the electronic resource, an unsolicited notification. For example, if the electronic resource is a web page that includes content related to an upcoming event, then the system can generate an unsolicited notification including a time, date, location, description, and/or other information related to the upcoming event and various graphical elements (e.g., as depicted in FIGS. 6A-6C) that allow a user to interact with the unsolicited notification. As another example, if the electronic resource is a networked appliance that the system can control over a computer network, then the system can generate an unsolicited notification indicating a current state of the networked appliance and various graphical elements (e.g., as depicted in FIGS. 6A-6C) that allow a user to interact with the unsolicited notification to change the current state of the networked appliance to a different state.

At block 356, the system determines a notification likelihood that the user will access the electronic resource in response to receiving the unsolicited notification. The system can determine the notification likelihood by applying one or more of the features of the electronic resource analyzed at block 352, the unsolicited notification generated at block 354, preferences of a user, and/or past behavior of a user as input across a machine learning model. In some implementations, the notification likelihood can be a probability that the user will access the electronic resource in response to receiving the unsolicited notification of the electronic resource. In other implementations, the notification likelihood can be a binary value (e.g., "0" or "1", "yes" or "no") that the user will access the electronic resource in response to receiving the unsolicited notification of the electronic resource.

At block 358, the system determines a baseline likelihood that the user will access the electronic resource without being solicited. The system can determine the baseline likelihood by applying one or more of the features of the electronic resource analyzed at block 352, the unsolicited notification generated at block 354, preferences of a user, and/or past behavior of a user as input across a machine learning model. In some implementations, the baseline likelihood can be a probability that the user will access the electronic resource without being solicited. In other implementations, the notification likelihood can be a binary value (e.g., "0" or "1", "yes" or "no") that the user will access the electronic resource without being solicited.

Moreover, in some implementations, the system can determine the notification likelihood at block 356 and can determine the baseline likelihood at block 358 in parallel. In other implementations, the system can determine the notification likelihood at block 356 and can determine the baseline likelihood at block 358 in series. In some versions of those other implementations, the system can determine the notification likelihood at block 356 and then can determine the baseline likelihood at block 358. In some other versions of those implementations, the system can determine the baseline likelihood at block 358 and then can determine the notification likelihood at block 356. Further, in some implementations, the machine learning model used to determine the notification likelihood at block 356 and the machine learning model used to determine the baseline likelihood at block 358 may be distinct machine learning models.

At block 360, the system compares the notification likelihood with the baseline likelihood. By comparing the notification likelihood with the baseline likelihood, the system can determine the difference between the notification likelihood and the baseline likelihood ("lift metric"). The lift metric is indicative of a quality of the unsolicited notification for a given user and can model a benefit of the unsolicited notification for a given user. For example, assume a first machine learning model is trained to generate a notification probability (e.g., 0.99) corresponding to the notification likelihood, a second machine learning model is trained to generate a notification probability (e.g., 0.95) corresponding to the baseline likelihood, and the system compares the probabilities to determine a lift metric (e.g., 0.04). Although the notification probability (e.g., 0.99) indicates there is a very strong likelihood that a given user will access the electronic resource in response to receiving the notification, the baseline probability (e.g., 0.95) indicates there is also a very strong likelihood that the given user will access the electronic resource without being solicited, so the lift metric (e.g., 0.04) indicates that the unsolicited notification provides little to no benefit for the given user.

At block 362, the system determines whether a difference between the notification likelihood and the baseline likelihood satisfies a threshold (e.g., 282 in FIG. 2). If, at an iteration of block 362, the system determines the difference between the notification likelihood and the baseline likelihood does not satisfy a threshold, then the system proceeds to block 364. At block 364, the system refrains from causing the unsolicited notification to be output to the user, and returns to block 352. For example, assume a first machine learning model is trained to generate a notification probability (e.g., 0.99) corresponding to the notification likelihood, a second machine learning model is trained to generate a notification probability (e.g., 0.95) corresponding to the baseline likelihood (resulting in a lift metric of 0.04), and a threshold of 0.30. Based on the lift metric of 0.04 failing to satisfy the threshold of 0.30, the system refrains from causing the unsolicited notification to be output to the user, and the system returns to block 352 to analyze one or more features of another electronic resource.

If, at an iteration of block 362, the system determines the difference between the notification likelihood and the baseline likelihood satisfies a threshold, then the system can proceed to optional block 366 (e.g., as indicated by dashed lines) or proceed directly to block 370. In contrast with the above example, assume a first machine learning model is trained to generate a notification probability (e.g., 0.40) corresponding to the notification likelihood, a second machine learning model is trained to generate a baseline probability (e.g., 0.00) corresponding to the baseline likelihood (resulting in a lift metric of 0.40), and a threshold of 0.30. Based on the lift metric of 0.40 satisfying the threshold of 0.30, the system refrains from causing the unsolicited notification to be output to the user, e.g., by proceeding through optional block 366 or directly to block 370.

If included, at optional block 366, the system can determine a disengagement probability that the user will disengage from a communications feed in response to receiving the unsolicited notification. The disengagement probability is a probability that the user will disengage (e.g., opt-out) from a communication feed through which the unsolicited notification is output to the user. Further, the disengagement probability can be determined based on previous user interactions with unsolicited notifications from a particular communications feed (e.g., never views unsolicited notifications, immediately dismisses unsolicited notifications, etc.), subsequent user interactions after receiving unsolicited notifications (e.g., unsubscribe from a communications feed) and/or other determinations.

If included, at optional block 368, the system can further determine whether the disengagement probability satisfies a threshold. If, at an iteration of optional block 368, the system determines the disengagement probability satisfies a threshold, then the system returns to block 364, refrains from causing the unsolicited notification to be output to the user, and returns to block 352. For example, even though a lift metric (e.g., 0.40) satisfies a threshold (e.g., 0.30) at block 362, a disengagement probability (e.g., 0.90) may also satisfy a threshold (e.g., 0.50) at block 368. Based on the disengagement probability satisfying the threshold, the system may refrain from causing the unsolicited notification to be output to the user to conserve network and/or on-device resources because it is not likely the user will interact with the unsolicited notification and/or will disengage from the communication feed altogether.

If, at an iteration of optional block 368, the system determines the disengagement probability does not satisfy a threshold, then the system proceeds to block 370. For example, if a lift metric (e.g., 0.40) satisfies a threshold (e.g., 0.30) at block 362 and a disengagement probability (e.g., 0.20) does not satisfy a threshold (e.g., 0.50) at block 368, then the system may determine the user will likely access or act upon the electronic resource that the user would likely not have otherwise accessed or acted upon and determine that the user will not respond negatively (e.g., disengage from a corresponding communications feed) in response to receiving the unsolicited notification.

At block 370, the system causes the unsolicited notification to be output to the user. For example, the unsolicited notification can be a pop-up window or card rendered on a display (e.g., as part of a home screen, feed, vehicle computing display, etc.), synthesized spoken output from an automated assistant or chat bot (e.g., to which a user can utter a response indicating whether the user wants to access the electronic resource), a text message, an email, a ticker tape notification, a notification on social media, and/or other types of notifications. Subsequent to causing the unsolicited notification to be output to the user, the system can return to block 352, and analyze one or more features of an additional electronic resource that is under consideration for solicitation to the user.

In some implementations, such as when the electronic resource is a networked appliance of the user that is controllable over one or more networks, the system can automatically change the state of the networked appliance of the user. In some versions of those implementations, automatically changing the state of the networked appliance of the user can be in addition to or in lieu of causing the unsolicited notification to be output to the user. For example, assume that the user left an oven on after cooking and that the system determines to cause an unsolicited notification to be output to the user based on the method 300. In this instance, the system can cause the unsolicited notification to be output to the user and turn the oven off in response to input directed to the unsolicited notification, the system can turn the oven off and provide an alternative unsolicited notification indicating that the oven was turned off, or the system can turn the oven off without providing any notification.

Figure 4:
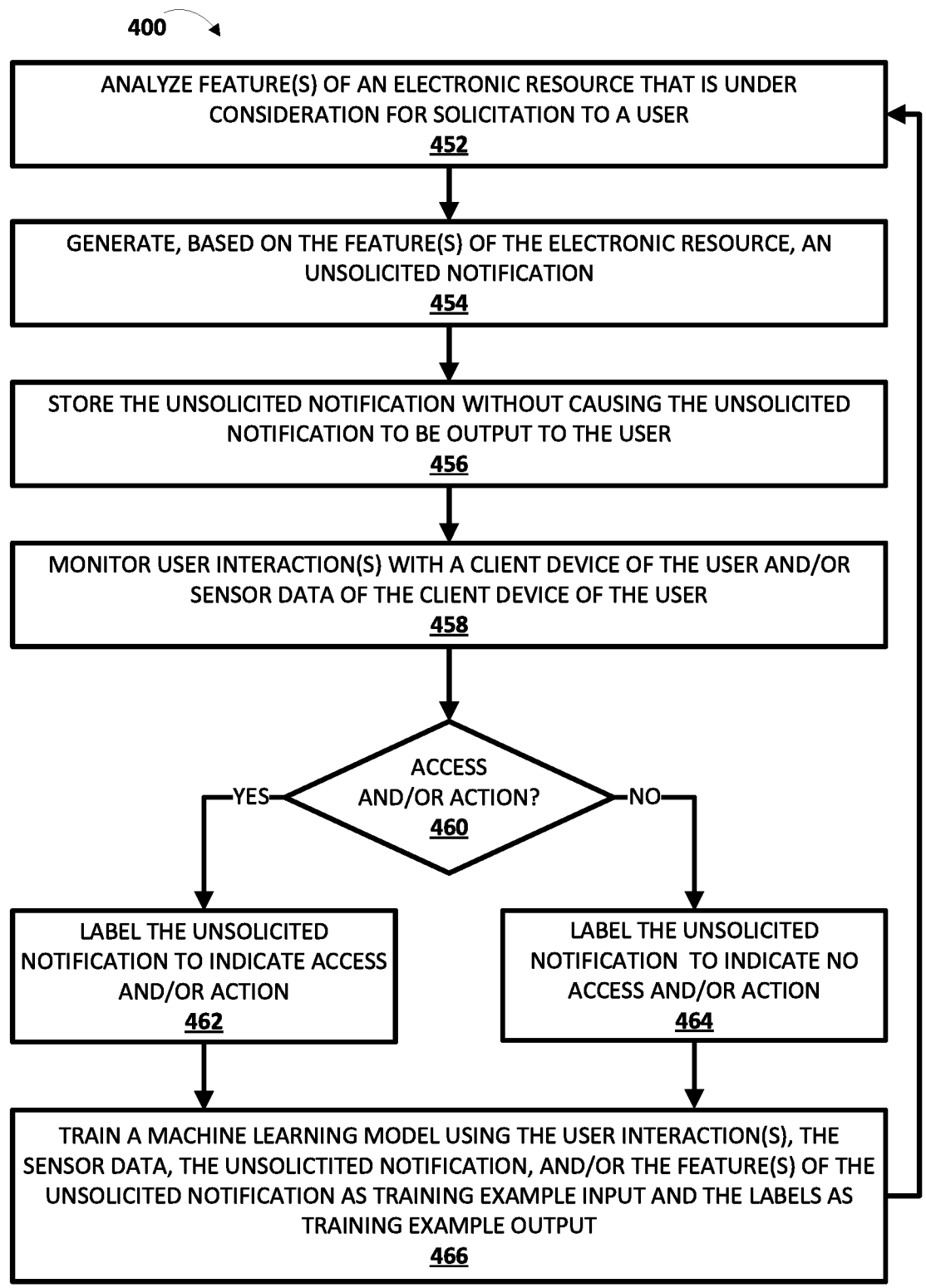
FIG. 4 depicts a flowchart illustrating an example method of generating training examples for a machine learning model and training the machine learning model, in accordance with various implementations.

FIG. 4 depicts a flowchart illustrating an example method 400 of generating training examples for a machine learning model and training the machine learning model. For convenience, the operations of the method 400 are described with reference to a system that performs the operations. This system of method 400 includes one or more processors and/or other component(s) of a client device (e.g., client device 110 of FIG. 1, computing device 710 of FIG. 7, and/or other client devices). Moreover, while operations of the method 400 are shown in a particular order, this is not meant to be limiting. One or more operations may be reordered, omitted, or added.

At block 452, the system analyzes one or more features of an electronic resource that is under consideration for solicitation to a user. For example, the electronic resource can be a web page, and the features of the web page can be content of interest to a user included in the web page, such as content related to an upcoming event, content related to an image or video included in the web page. As another example, the electronic resource can be a networked appliance that the system can control over a computer network, and the features of the networked appliance can be feature(s) of the state of the networked appliance, such as whether a light is "on", "off", or "dimmed", whether a door or window is "opened" or "closed", whether a sprinkler is "on" or "off", whether an oven is "on", "off", and/or a temperature thereof, and/or other states of other networked appliances.

At block 454, the system generates, based on one or more of the features of the electronic resource, an unsolicited notification. For example, if the electronic resource is a web page that includes content related to an upcoming event, then the system can generate an unsolicited notification including a time, date, location, description, and/or other information related to the upcoming event and various graphical elements (e.g., as depicted in FIGS. 6A-6C) that allow a user to interact with the unsolicited notification. As another example, if the electronic resource is a networked appliance that the system can control over a computer network, then the system can generate an unsolicited notification indicating a current state of the networked appliance and various graphical elements (e.g., as depicted in FIGS. 6A-6C) that allow a user to interact with the unsolicited notification to change the current state of the networked appliance to an altered or different state.

At block 456, the system stores the unsolicited notification without causing the unsolicited notification to be output to the user. The unsolicited notification generated at block 454 can be stored in one or more databases (e.g., stored in notification(s) database 160 of FIG. 1). In some implementations, one or more of the databases can be local to a client device (e.g., client device 110 of FIG. 1). In other implementations, one or more of the databases can be cloud-based (e.g., one or more servers 199).

At block 458, the system monitors one or more user interactions with a client device of the user and/or sensor data of the client device of the user. For example, the user interactions with a client device of the user can include opening various web pages, viewing image(s), listening to audio file(s), downloading application(s), streaming of a television show or movie, controlling a networked appliance of the user, and/or other user interactions. The sensor data can be generated remotely (e.g., at server(s) 199) and/or locally at client device 110 based on one or more sensors of the client device, and can include location data via a location sensor, accelerometer data via an accelerometer, heart rate data via a heart rate sensor, pedometer data via a pedometer, magnetometer data via a magnetometer, gyroscope data via a gyroscope, and/or other sensor data generated by a corresponding sensor of the client device. For example, the system can determine the user visited a particular location based on the location data of the client device. As another example, the system can determine the user is walking, jogging, or running based on the pedometer data, heart rate data, and/or the accelerometer data of the client device or an additional client device of the user in communication with the client device of the user.

At block 460, the system determines, based on one or more of the user interactions with the client device of the user and/or the sensor data of the client device of the user, whether the user accessed the electronic resource of the unsolicited notification and/or the user acted upon contents of the unsolicited notification. For example, the system can determine whether the user accessed or did not access a particular electronic resource based on whether the user visited a particular web page, listened to a particular song, watched a particular show or movie, subscribed to a particular, turned one or off a particular smart light, and/or other user interactions. As another example, the system can determine whether the user acted upon or did not act upon contents of the electronic resource based on location data of the client device of the user indicating the user attended a particular event, the user went for a walk, jog, or run, the user drove to a particular location, and/or other actions.

If, at an iteration of block 460, the system determines the user accessed the electronic resource of the unsolicited notification and/or the user acted upon contents of the unsolicited notification, then the system proceeds to block 462 and labels the unsolicited notification accordingly. For example, assume the unsolicited notification generated at block 454 includes content that indicates a new season of a particular television show airs on channel XYZ and that includes a graphical element that, when selected, enables a user to opt-in to weekly notifications an hour before the particular television show airs each week. However, even though the unsolicited notification generated at block 454 was not output to the user, assume the user accessed a particular web page or application to opt-in for notifications related to the particular television show. Accordingly, in this example, the unsolicited notification generated at block 454 can be labeled to indicate the user accessed the given electronic resource based on the user opting-in for notifications for the particular television show despite not receiving the unsolicited notification generated at block 454. Thus, causing the notification to be output to the user would have wasted network and computational resources.

As another example, assume the unsolicited notification generated at block 454 includes content that indicates a user forgot to turn off a back porch light before leaving home for work, and that includes a graphical element that, when selected, causes the back porch light to be turned off (e.g., via a software application installed on a client device associated with networked lights and/or other software applications that enable control of networked appliances). However, even though the unsolicited notification generated at block 454 was not output to the user, assume the user turned off the back porch light off within a threshold amount of time of leaving home as indicated by sensor data (e.g., location data via sensors 130 of FIG. 1). Accordingly, in this example, the unsolicited notification generated at block 454 can be labeled to indicate the user acted upon contents of the given electronic resource based on the user turning the back porch light off within the threshold amount of time of leaving home for work despite not receiving the unsolicited notification generated at block 454. Thus, causing the notification to be output to the user would have wasted network and computational resources. Further, one or more features of the electronic resource analyzed at block 452, the unsolicited notification generated at block 454, and/or the corresponding label from block 462 can be stored in one or more databases (e.g., training examples database 166 of FIG. 1).

If, at an iteration of block 460, the system determines the user did not access the electronic resource of the unsolicited notification and/or the user did not act upon contents of the unsolicited notification, then the system proceeds to block 464 and labels the unsolicited notification accordingly. For example, assume the unsolicited notification generated at block 454 includes content that indicates a time, date, location, and/or other information related to an upcoming concert and that includes a graphical element that, when selected, enables a user to purchase tickets to the upcoming concert. Further, based on the temporal data and the location data of the client device of the user, assume the user did not attend the concert. Accordingly, in this example, the unsolicited notification generated at block 454 can be labeled to indicate the user did not act upon the contents of the unsolicited notification generated at block 454. Thus, causing the notification to be output to the user would have been an appropriate use of network and computational resources.

As another example, assume the unsolicited notification generated at block 454 includes content that indicates a user forgot to turn off a back porch light before leaving home for work, and that includes a graphical element that, when selected, causes the back porch light to be turned off (e.g., via a software application installed on a client device associated with networked lights and/or other software applications that enable control of networked appliances). Further, assume the user did not turn the back porch light off within a threshold amount of time after returning home from work. Accordingly, in this example, the unsolicited notification generated at block 454 can be labeled to indicate the user did not turn the back porch light off within the threshold amount of time after returning home from work. Thus, causing the notification to be output to the user would have been an appropriate use of network and computational resources. Further, one or more features of the electronic resource analyzed at block 452, the unsolicited notification generated at block 454, and/or the corresponding label from block 464 can be stored in one or more databases (e.g., training examples database 166 of FIG. 1).

At block 466, the system trains a machine learning model using one or more of the user interactions, the sensor data, the unsolicited notification, and/or one or more of the features of the unsolicited notification as training example input and the labels as training example output. This supervised learning technique enables the trained machine learning model to determine a baseline likelihood (e.g., at block 358 of FIG. 3) as described herein. In some implementations, the machine learning model can be a neural network, support vector machine ("SVM"), decision tree, and/or other types of machine learning models.

FIG. 5 depicts a table 500 illustrating example metrics for a plurality of users and for a given electronic resource and/or corresponding unsolicited notification, in accordance with various implementations. For convenience, the various metrics included in the table 500 of FIG. 5 are described as being determined by a system, such as client device 110 of FIG. 1, additional client device(s) 196, server(s) 199 of FIG. 1, computing device 710 of FIG. 7, a cloud-based system, other systems, and/or any combination thereof.

The table 500 includes rows R1-RN, and each of the rows R1-RN correspond to a particular user. For example, a first row corresponds to "User 1" R1, a second row corresponds to "User 2" R2, a third row corresponds to "User 3" R3, and a fourth row corresponds to "User N" RN, where N is a positive integer corresponding to a number of users. Further, the table 500 includes columns C1-C4, and each of the columns C1-C4 correspond to various metrics for the given electronic resource. For example, a first column corresponds to a "Notification Likelihood" C1, a second column corresponds to a "Baseline Likelihood" C2, a third column corresponds to a "Lift Metric" C3 (e.g., the difference between the "Notification Likelihood" and a "Baseline Likelihood" for a given user for the given electronic resource), and a fourth column corresponds to a "Disengagement Probability" C4.

In some implementations, even though a notification likelihood indicates that a user will access or act upon a given electronic resource included in a corresponding unsolicited notification, the system may refrain from causing the corresponding unsolicited notification to be output to the user based on the difference between the notification likelihood and a baseline likelihood ("lift metric"). In some versions of these implementations, the system refrains from causing the corresponding unsolicited notification to be output to the user when the lift metric fails to satisfy a threshold. For example, assume the system includes one or more machine learning models trained to determine probabilities for the notification likelihood and the baseline likelihood. Further, with respect to User 1 R1, assume the system determines, using one or more of the trained machine learning models, a notification likelihood of 0.99 R1,C1 and a baseline likelihood of 0.95 R1,C2. Moreover, the system can compare the notification likelihood of 0.99 R1,C1 to the baseline likelihood of 0.95 R1,C2 to determine the lift metric of 0.04 R1,C3, and can also compare the lift metric of 0.04 R1,C3 to a threshold (e.g., 0.35). Based on the lift metric of 0.04 R1,C3 failing to satisfy the threshold of 0.35, the system refrains from causing the unsolicited notification to be output to User 1 R1 even the notification likelihood of 0.99 R1,C1 indicates there is a very high likelihood the user will interact with the corresponding unsolicited notification. In this example, by determining whether to send the unsolicited notification to the user based on the lift metric, the system can conserve local and/or network resources as compared to conventional methods that do not consider the likelihood of whether a user would have accessed or acted upon content(s) of an electronic resource without receiving the unsolicited notification.

In contrast with the above example, and with respect to User 2 R2, assume the system determines, using one or more of the trained machine learning models, a notification likelihood of 0.40 R2,C1 and a baseline likelihood of 0.05 R2,C2. Moreover, the system can compare the notification likelihood of 0.40 R2,C1 to the baseline likelihood of 0.05 R2,C2 to determine the lift metric of 0.35 R2,C3, and can also compare the lift metric of 0.35 R2,C3 to a threshold (e.g., 0.30). Based on the lift metric of 0.35 R2,C3 satisfying the threshold of 0.30, the system causes the unsolicited notification to be output to User 2 R2 even the notification likelihood of 0.40 R2,C1 indicates there is not a very high likelihood the user will interact with the corresponding unsolicited notification. In this example, a magnitude of the lift metric of 0.35 R2,C3 indicates the corresponding unsolicited notification may be a high quality notification for User 2 R2 because it is unlikely the user would have accessed and/or acted upon the electronic resource without receiving the unsolicited notification. Further, in this example, it is unlikely conventional techniques that only consider a likelihood a user will access the given electronic resource in response to receiving the corresponding unsolicited notification would determine to output the corresponding unsolicited notification despite the corresponding unsolicited notification being a high quality notification for User 2 R2.

In some implementations, even though a notification likelihood indicates that a user will access or act upon a given electronic resource included in a corresponding unsolicited notification, the system may refrain from causing the corresponding unsolicited notification to be output to the user based on a disengagement probability. The disengagement probability can indicate how a user will react in response to receiving the corresponding notification from a particular communications feed, and can be determined based on previous user interactions with unsolicited notifications from a particular communications feed (e.g., the user never views unsolicited notifications, immediately dismisses unsolicited notifications, etc.), subsequent user interactions after receiving unsolicited notifications (e.g., the user frequently unsubscribes from various communications feeds) and/or other determinations. In some versions of these implementations, the system refrains from causing the given unsolicited notification to be output to the user when the disengagement probability satisfies a threshold.

For example, assume the system includes one or more machine learning models trained to determine probabilities for a lift metric. Further, with respect to User 3 R3, assume the system determines, using one or more of the trained machine learning models, a lift metric 0.60 R3,C3. However, assume the system determines a disengagement probability of 0.90 R3,C4, and compares the disengagement probability of 0.90 R3,C4 to a threshold (e.g., 0.50). Based on the disengagement probability of 0.90 R3,C4 satisfying the threshold of 0.50, the system refrains from causing the unsolicited notification to be output to User 3 R3 even though a notification likelihood of 0.70 R3,C1 indicates there is a relatively high likelihood the user will interact with the given unsolicited notification and the lift metric of 0.60 R3, C3 indicates for the given unsolicited notification is a high quality notification for User 3 R3. In this example, by considering the disengagement probability in determining whether to send the unsolicited notification, the system can conserve local and/or network resources as compared to conventional methods that do not consider how a user will react to a given unsolicited notification from a particular communications feed.

In some additional implementations, although the disengagement probability satisfies a threshold, the system may cause the given unsolicited notification to be output to the user if the disengagement is within a threshold range of the threshold. For example, and with respect to User N RN, assume the system determines, using one or more of the trained machine learning models, a lift metric of 0.50 RN,C3. Further assume the system determines a disengagement probability of 0.50 RN,C4, and compares the disengagement probability of 0.50 RN,C4 to a threshold (e.g., 0.45). Although the disengagement probability of 0.50 RN,C4 satisfies the threshold of 0.45, it is within a threshold range (e.g., +/−0.10) of the threshold of 0.45. Based on the disengagement probability of 0.50 RN,C4 satisfying the threshold of 0.45, but being within the threshold amount (e.g., +/−0.10) of the threshold of 0.45, the system causes the unsolicited notification to be output to User N RN even though there is a moderate likelihood that User N RN will disengage from the particular communications. In this example, by considering both the disengagement probability and/or the lift metric in determining whether to send the unsolicited notification, the system can conserve local and/or network resources as compared to conventional methods that do not consider how a user will react to a given unsolicited notification from a particular communications feed.

FIGS. 6A-6C depict various non-limiting examples of unsolicited notifications 610A-610C, in accordance with various implementations. As described herein, the unsolicited notifications 610A-610C are generated based on analyzing one or more features of a given electronic resource. Each of the unsolicited notifications 610A-610C are generated locally at a client device (e.g., client device 110 of FIG. 1, computing device 710 of FIG. 7), remotely at one or more additional client devices (e.g., additional client devices 196 of FIG. 1), and/or remotely at one or more servers (e.g., server(s) 199 of FIG. 1). Further, each of the unsolicited notifications 610A-610C include corresponding content 611A-611C that is based on a one or more of the features of the given electronic resource. In some implementations, each of the unsolicited notifications 610A-610C also include various graphical elements 612A-612C, 613, 614 that are selectable by the user (e.g., via touch input or spoken input directed to the various graphical elements 612A-612C, 613, 614). Moreover, in some implementations, the unsolicited notifications 610A-610C are ultimately output to a user, while in other implementations, the unsolicited notifications 610A-610C are withheld from the user for training purposes and/or other purposes (e.g., lift metric fails to satisfy a threshold, disengagement probability satisfies a threshold, etc.).

With respect to FIG. 6A, a first notification 610A from a communication feed associated with "Channel XYZ" communication feed is depicted. The first notification 610A can be generated based on features of a given electronic resource, such as a web page, television guide, and/or application installed on the client device associated with Channel XYZ, and can include content 611A notifying a user that "A new season of 'Virtuous Trinkets' airs on Channel XYZ this upcoming Sunday at 10:00 PM EST". Further, the first notification 610A can include a first graphical element 612A of "Receive Notifications" that is selectable by the user. In some implementations, the first graphical element 612A is hyperlinked to the web page or television guide related to Channel XYZ and/or associated with an application installed on the client device of the user (e.g., a television viewing application). In some additional and/or alternative implementations the first graphical element 612A, when selected, causes the user to opt-in and receive notifications prior to a season premier and/or each episode of the new season of "Virtuous Trinkets". In some other implementations, such as when the first notification 610A is withheld from being output to the user, a client device can monitor user interactions with the client device to determine whether the user accessed the web page, television guide, and/or application associated with Channel XYZ and to determine whether the user opted-in for receiving notifications prior to a season premier and/or each episode of the new season of "Virtuous Trinkets". In some versions of these implementations, the first notification 610A can be labeled (e.g., as described in FIG. 4) and used as a training example for updating one or more machine learning models based on whether the user subscribes to future notifications for "Various Trinkets".

Moreover, in some implementations, the first notification 610A can also include a second graphical element 613 of "Opt-out of Notifications" and a third graphical element 614 of "Dismiss" that are each selectable by the user. In some versions of those implementations, user selection of the second graphical element 613 of "Opt-out of Notifications" causes the user to disengage (e.g., unsubscribe) from the communication feed associated with Channel XYZ, such that the user will no longer receive unsolicited notifications from Channel XYZ. Further, a disengagement probability can be updated for the user for communication feeds of a same type as Channel XYZ. In some versions of those implementations, user selection of the third graphical element 614 of "Dismiss" causes the first notification 610A to be dismissed from the client device, such that the user does not access the electronic resource associated with the first notification 610A. In some further versions of those implementations, the user may still receive future unsolicited notifications from Channel XYZ.

With respect to FIG. 6B, a second notification 610B from a communication feed associated with "Facespace" communication feed is depicted. The second notification 610B can be generated based on features of a given electronic resource, such as a web page, social media post/event, and/or application installed on the client device associated with Facespace, and can include content 611B notifying a user that "The Blue Cold Poblano Peppers are performing at the Blue Pebbles Amphitheatre next month" (and can optionally include more information, such as a specific time and/or date of the performance). Further, the second notification 610B can include a first graphical element 612B of "Buy tickets" that is selectable by the user. In some implementations, the first graphical element 612B is hyperlinked to the web page or social media post/event related to Facespace and/or associated with another application installed on the client device of the user (e.g., a ticket purchasing application). In some implementations, the first graphical element 612B, when selected, enables the user to buy tickets to the "Blue Cold Poblano Peppers" performance at a ticket purchasing application and/or to express interest in attending the "Blue Cold Poblano Peppers" performance via Facespace. In other implementations, such as when the second notification 610B is withheld from being output to the user, a client device can monitor sensor data (e.g., location data via a GPS sensor) of the client device of the user to determine whether the user attended the "Blue Cold Poblano Peppers" performance and/or can monitor user interactions with the client device to determine whether the user expressed interest in in attending the "Blue Cold Poblano Peppers" performance via Facespace. In some versions of these implementations, the second notification 610B can be labeled (e.g., as described in FIG. 4) and used as a training example for updating one or more machine learning models based on determining whether the user attends the "Blue Cold Poblano Peppers" performance.

Moreover, in some implementations, the second notification 610B can also include a second graphical element 613 of "Opt-out of Notifications" and a third graphical element 614 of "Dismiss" that are each selectable by the user. In some versions of those implementations, user selection of the second graphical element 613 of "Opt-out of Notifications" causes the user to disengage (e.g., unsubscribe) from the communication feed associated with Facespace, such that the user will no longer receive unsolicited notifications from Facespace. Further, a disengagement probability can be updated for the user for communication feeds of a same type as Facespace. In some versions of those implementations, user selection of the third graphical element 614 of "Dismiss" causes the second notification 610B to be dismissed from the client device, such that the user does not access the electronic resource associated with the second notification 610B. In some further versions of those implementations, the user may still receive future unsolicited notifications from Facespace.

With respect to FIG. 6C, a third notification 610C from a communication feed associated with a "Networked Lights Company" communication feed is depicted. The third notification 610C can be generated based on features of a given electronic resource, such as an indication of a state of a networked light and/or data from application installed on the client device that is associated with Networked Lights Company, and can include content 611C notifying a user that "It looks like you forgot to turn your back porch light off before leaving home for work". Further, the third notification 610C can include a first graphical element 612C of "Turn the light off" that is selectable by the user. In some implementations, the first graphical element 612C is associated with a software application installed on the client device of the user (e.g., a software application associated with Networked Lights Company and/or other software applications for controlling various networked appliances). Further, the first graphical element 612C, when selected, enables the user to turn the back porch light off. In other implementations, such as when the third notification 610C is withheld from being output to the user, a client device can monitor sensor data of the back porch light and/or data from a software application associated with Networked Lights Company to determine whether the user turned the back porch light off remotely while at work. In some versions of these implementations, the third notification 610C can be labeled (e.g., as described in FIG. 4) and used as a training example for updating one or more machine learning models based on determining whether the user turns the back porch light off remotely while at work via one or more software applications.

Moreover, in some implementations, the third notification 610C can also include a second graphical element 613 of "Opt-out of Notifications" and a third graphical element 614 of "Dismiss" that are each selectable by the user. In some versions of those implementations, user selection of the second graphical element 613 of "Opt-out of Notifications" causes the user to disengage (e.g., unsubscribe) from the communication feed associated with the Smart Light, such that the user will no longer receive unsolicited notifications about the Smart Light. Further, a disengagement probability can be updated for the user for communication feeds of a same type as Networked Lights Company. In some versions of those implementations, user selection of the third graphical element 614 of "Dismiss" causes the second notification 6106 to be dismissed from the client device, such that the user does not access the electronic resource associated with the second notification 6106. In some further versions of those implementations, the user may still receive future unsolicited notifications associated with the Networked Lights Company.

In some additional and/or alternative implementations, such as when an electronic resource is a networked appliance, a client device can automatically send one or more signals to alter and/or change the state of the networked appliance. For example, rather than generating the third notification 610C indicating that the user forgot to turn the back porch light off before leaving home for work, the client device can send one or more signals (e.g., via a software application associated with Networked Lights Company) to the back porch light to automatically turn the back porch light off. In some versions of those implementations, the client device may turn the back porch light off without even alerting the user the back porch light was automatically turned off to converse local and/or network resources. In some other versions of those implementations, the third notification 610C can include alternative content alerting the user that the back porch light was automatically turned off to conserve electricity. Other natural resources consumed by networked appliances can be conserved in a similar manner, such as turning of a networked sprinkler to conserve water, adjusting a temperature of a networked thermostat to conserve gas and/or electricity, turning off an over to conserve gas and/or electricity and to obviate safety hazards, closing networked blinds to conserve gas and/or electricity, and so forth. Although the natural resources conserved by a single unsolicited notification for a given user may be negligible, a substantial amount of natural resources can be conserved when considering the aggregate amount of unsolicited notifications for a plurality of users.

Moreover, although the unsolicited notifications 610A-610C of FIGS. 6A-6C are depicted as being pop-up notifications that can be visually rendered on a display of a client device, it should be understood that is for exemplary purposes and not meant to be limiting. For example, the notification can be synthesized spoken output from an automated assistant or chat bot (e.g., to which a user can utter a response indicating whether the user wants to access the electronic resource), a text message, an email, a ticker tape notification, a notification on social media, and so forth. Further, user input directed to the notification can cause a client device to execute various actions, such as selecting a hyperlink to navigate to a web page, launching an application to a state tailored to the content of the notification, automatically purchasing an item included in the content of the notification, controlling one or more networked appliances associated with the user, and/or other actions based on a given electronic resource.

Figure 7:
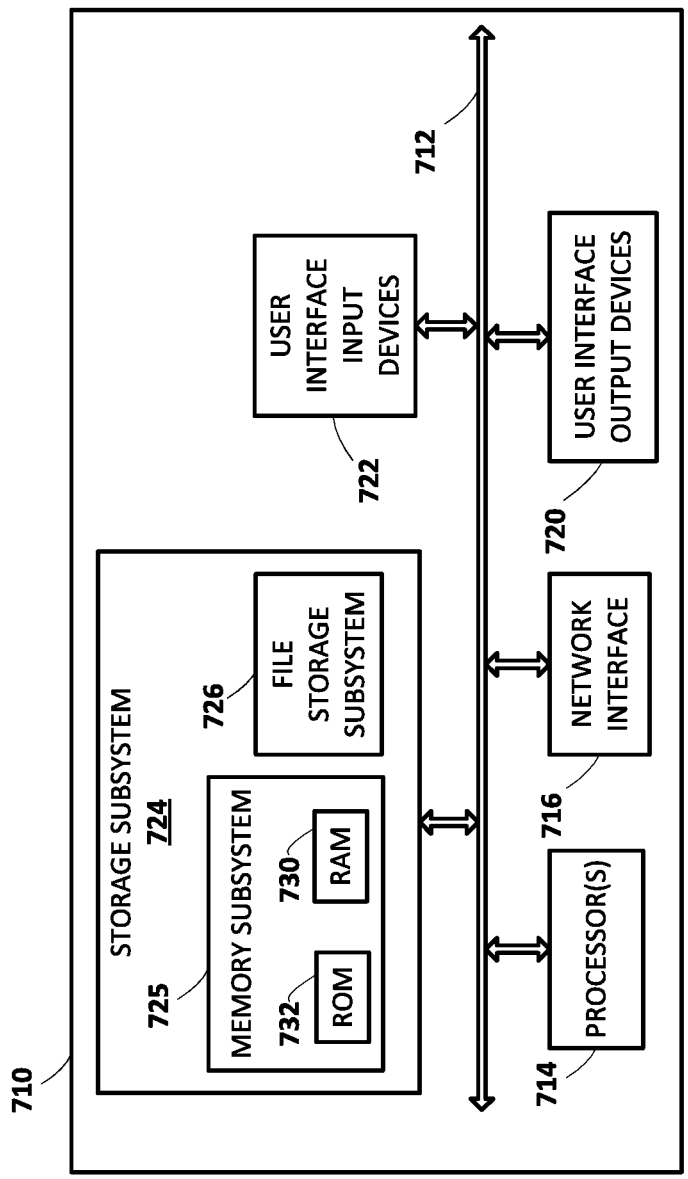
FIG. 7 depicts an example architecture of a computing device, in accordance with various implementations.

FIG. 7 is a block diagram of an example computing device 710 that may optionally be utilized to perform one or more aspects of techniques described herein. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In various implementations, a method implemented using one or more processors may include: analyzing one or more features of an electronic resource, wherein the electronic resource is under consideration for solicitation to a user; based on the analyzing: determining a notification likelihood that the user will access the electronic resource in response to an unsolicited notification of the electronic resource being output to the user, and determining a baseline likelihood that the user will access the electronic resource without being solicited; comparing the notification likelihood with the baseline likelihood; and based on the comparing, causing the unsolicited notification to be output to the user.

In various implementations, the comparing comprises comparing a difference between the baseline likelihood and the notification likelihood with a threshold, and wherein the causing is in response to the difference satisfying the threshold. In various implementations, the unsolicited notification comprises the electronic resource. In various implementations, the notification likelihood or the baseline likelihood is further determined based on content of the unsolicited notification.

In various implementations, determining the baseline likelihood comprises applying data associated with the electronic resource as input across a machine learning model to generate output indicative of the baseline likelihood. In various implementations, the machine learning model is trained using training data that comprises at least one training example for which an unsolicited notification was generated for a given electronic resource but ultimately not output, and wherein the at least one training example is labeled to indicate subsequent access or non-access of the given electronic resource by the user or a different user.

In various implementations, the baseline likelihood is further determined based at least in part on past behavior or a preference of the user. In various implementations, the notification likelihood is further determined based at least in part on past behavior or a preference of the user. In various implementations, the method may further include: determining a disengagement probability that the user will disengage from a communication feed through which the unsolicited notification is output to the user, wherein the causing is further in response to a comparison of the disengagement probability with one or both of the baseline likelihood and the notification likelihood.

In another aspect, a method implemented using one or more processors may include: generating a plurality of training examples, wherein generating each training example, of the plurality of training examples, comprises: identifying a given electronic resource that is under consideration for solicitation to a user; extracting one or more features from the given electronic resource; generating, based on one or more of the extracted features of the given electronic resource, an unsolicited notification; withholding the unsolicited notification; storing, in one or more databases, data indicative of the unsolicited notification; determining whether the user accessed the given electronic resource at a client device of the user or acted upon content of the given electronic resource as indicated by sensor data of the client device of the user; and assigning, based on an outcome of the determining, a label for the unsolicited notification; and training, based on the plurality of training examples and the assigned label, a machine learning model to determine whether to cause the unsolicited notification to be output to the user.

In various implementations, determining whether the user accessed the given electronic resource at the client device comprises monitoring user interactions with the client device to determine one or more of: the user accessed the content of the given electronic resource, the user accessed a same type of the content at a different electronic resource, or the user subscribed to content of the given electronic resource. In various implementations, the sensor data of the client device of the user includes one or more of: location data, accelerometer data, heart rate data, pedometer data, magnetometer data, or gyroscope data.

In various implementations, determining the user acted upon the content of the given electronic resource comprises determining, based on the location data, the user visited a location included in the content of the given electronic resource. In various implementations, determining whether the user acted upon the content of the given electronic resource comprises determining, based on the heart rate data and/or the pedometer data, the user participated in an event included in the content of the given electronic resource.

In another aspect, a method implemented using one or more processors may include: analyzing one or more features of an electronic resource, wherein the electronic resource is under consideration for solicitation to a user, and wherein the electronic resource is associated with one or more networked appliances of the user that are controllable over one or more networks; based on the analyzing: determining a notification likelihood that the user will control one or more of the networked appliances in response to the unsolicited notification of the electronic resource being output to the user, and determining a baseline likelihood that the user will control one or more of the networked appliances without being solicited; comparing the notification likelihood with the baseline likelihood; based on the comparing, causing the unsolicited notification to be output to the user; and receiving, responsive to the unsolicited notification being output to the user, user input directed to the unsolicited notification, the user input causing one or more of the networked appliances of the user to be controlled over one or more of the networks.

In various implementations, the comparing comprises comparing a difference between the baseline likelihood and the notification likelihood with a threshold, and wherein the causing is in response to the difference satisfying the threshold. In various implementations, the unsolicited notification includes an indication of a state of one or more of the networked appliances. In various implementations, the notification likelihood and/or baseline likelihood is further determined based on the indication of the state of one or more of the networked appliances. In various implementations, determining the baseline likelihood comprises applying data associated with one or more of the networked appliances as input across a machine learning model to generate output indicative of the baseline likelihood. In various implementations, the machine learning model is trained using training data that comprises at least one training example for which an unsolicited notification was generated for a given networked appliance but ultimately not output, and wherein the at least one training example is labeled to indicate subsequent control or non-control of the given networked appliance by the user or a different user.

What is claimed is:

1. A method implemented using one or more processors, comprising:
   analyzing one or more features of an electronic resource, wherein the electronic resource is under consideration for solicitation to a user as part of an unsolicited notification that is selectable to access the electronic resource;
   based on the analyzing:
      determining a notification likelihood that the user will access the electronic resource in response to the unsolicited notification of the electronic resource being output to the user,
      determining a baseline likelihood that the user will access the electronic resource without the unsolicited notification of the electronic resource being output to the user,
         wherein determining the baseline likelihood comprises applying data associated with the electronic resource as input across a machine learning model to generate output indicative of the baseline likelihood,
         wherein the machine learning model is trained using training data that comprises at least one training example for which a given unsolicited notification was generated for a given electronic resource but ultimately not output, and
         wherein the at least one training example is labeled to indicate subsequent access or non-access of the given electronic resource by the user or a different user, and
      determining a disengagement probability that the user will disengage from a communication feed through which the unsolicited notification is output to the user;
   comparing the notification likelihood with the baseline likelihood to determine a numerical difference between the notification likelihood and the baseline likelihood;
   comparing the disengagement probability with the notification likelihood to determine an additional numerical difference between the disengagement probability and the notification likelihood; and
   in response to determining the numerical difference between the notification likelihood and the baseline likelihood satisfies a threshold, and in response to determining the additional numerical difference between the disengagement probability and the notification likelihood fails to satisfy an additional threshold, causing the unsolicited notification to be output to the user.

2. The method of claim 1, wherein the unsolicited notification comprises the electronic resource.

3. The method of claim 1, wherein the notification likelihood or the baseline likelihood is further determined based on content of the unsolicited notification.

4. The method of claim 1, wherein the baseline likelihood is further determined based at least in part on past behavior or a preference of the user.

5. The method of claim 1, wherein the notification likelihood is further determined based at least in part on past behavior or a preference of the user.

6. A method implemented using one or more processors, comprising:
   analyzing one or more features of an electronic resource, wherein the electronic resource is under consideration for solicitation to a user as part of an unsolicited notification that is selectable to access the electronic resource, and wherein the electronic resource is associated with one or more networked appliances of the user that are controllable over one or more networks;
   based on the analyzing:
      determining a notification likelihood that the user will control one or more of the networked appliances in response to the unsolicited notification of the electronic resource being output to the user,
      determining a baseline likelihood that the user will control one or more of the networked appliances without the unsolicited notification of the electronic resource being output to the user,
         wherein determining the baseline likelihood comprises applying data associated with the electronic resource as input across a machine learning model to generate output indicative of the baseline likelihood,
         wherein the machine learning model is trained using training data that comprises at least one training example for which a given unsolicited notification was generated for a given electronic resource but ultimately not output,
         wherein the at least one training example is labeled to indicate subsequent access or non-access of the given electronic resource by the user or a different user, and
      determining a disengagement probability that the user will disengage from a communication feed through which the unsolicited notification is output to the user;
   comparing the notification likelihood with the baseline likelihood to determine a numerical difference between the notification likelihood and the baseline likelihood;
   comparing the disengagement probability with the notification likelihood to determine an additional numerical difference between the disengagement probability and the notification likelihood;
   in response to determining the numerical difference between the notification likelihood and the baseline likelihood satisfies a threshold, and in response to determining the additional numerical difference between the disengagement probability and the notification likelihood fails to satisfy an additional threshold, causing the unsolicited notification to be output to the user; and
   receiving, responsive to the unsolicited notification being output to the user, user input directed to the unsolicited notification, the user input causing one or more of the networked appliances of the user to be controlled over one or more of the networks.

7. The method of claim 6, wherein the unsolicited notification includes an indication of a state of one or more of the networked appliances.

8. The method of claim 7, wherein the notification likelihood and/or baseline likelihood is further determined based on the indication of the state of one or more of the networked appliances.

* * * * *